United States Patent [19]
Auberon et al.

[11] Patent Number: 5,428,896
[45] Date of Patent: Jul. 4, 1995

[54] METHOD FOR PRODUCING A MONOBLOCK COMPOSITE CONNECTING ROD BY PLACING PREIMPREGNATED FIBERS ON AN EXTRACTABLE MANDREL

[75] Inventors: Marcel Auberon, Le Haillan; Jean-Francois Fuchs, Sainte Helene; Jean-Philippe Leard, Merignac, all of France

[73] Assignee: Societe Anonyme Dite Aerospatiale Societe Nationale Industrielle, Paris, France

[21] Appl. No.: 248,490

[22] Filed: May 24, 1994

[30] Foreign Application Priority Data

May 26, 1993 [FR] France .................. 93 06614

[51] Int. Cl.⁶ .............................. B23P 15/00
[52] U.S. Cl. .................. 29/888.09; 29/888.091; 29/888.092
[58] Field of Search .......... 29/890.09, 890.091, 29/890.092; 74/579 R, 579 E, 587

[56] References Cited

U.S. PATENT DOCUMENTS

| | | |
|---|---|---|
| 3,970,495 | 7/1976 | Ashton et al. . |
| 4,218,895 | 8/1980 | Smith et al. . |
| 4,292,368 | 9/1981 | Mialon . |
| 4,325,174 | 4/1982 | Smith et al. . |
| 4,335,587 | 6/1982 | Thomamueller et al. . |
| 4,458,555 | 7/1984 | Holtzberg et al. ............. 29/888.091 |

FOREIGN PATENT DOCUMENTS

| | | |
|---|---|---|
| 0013648 | 7/1980 | European Pat. Off. . |
| 1296806 | 5/1962 | France . |
| 2446180 | 8/1980 | France . |
| 2550123 | 2/1985 | France . |
| 2927955 | 1/1981 | Germany . |
| 3936999 | 5/1990 | Germany . |
| 0238039 | 10/1987 | Japan ................. 29/888.092 |
| 1707327 | 1/1992 | U.S.S.R. ............... 29/888.09 |

OTHER PUBLICATIONS

French Search Report and Annex.
English Language Abstract of JP-A-63-025023.

*Primary Examiner*—Irene Cuda
*Attorney, Agent, or Firm*—Sandler, Greenblum & Bernstein

[57] ABSTRACT

A method for producing a connecting rod, particularly a monoblock composite connecting rod, by placing preimpregnated fibers on an extractable mandrel, with the following successive stages. Embodying on a rigid central shaft a meltable mandrel with a shape corresponding to that of the connecting rod; winding and/or laying down the preimpregnated fibers according to a predetermined number of layers and an inclination of the fibers with respect to the longitudinal axis of the mandrel; polymerization with a homogeneous compacting pressure being applied to the entire outer surface of the unit; and then final operations for removing the mandrel and machining to required dimensions of the connecting rod.

15 Claims, 6 Drawing Sheets

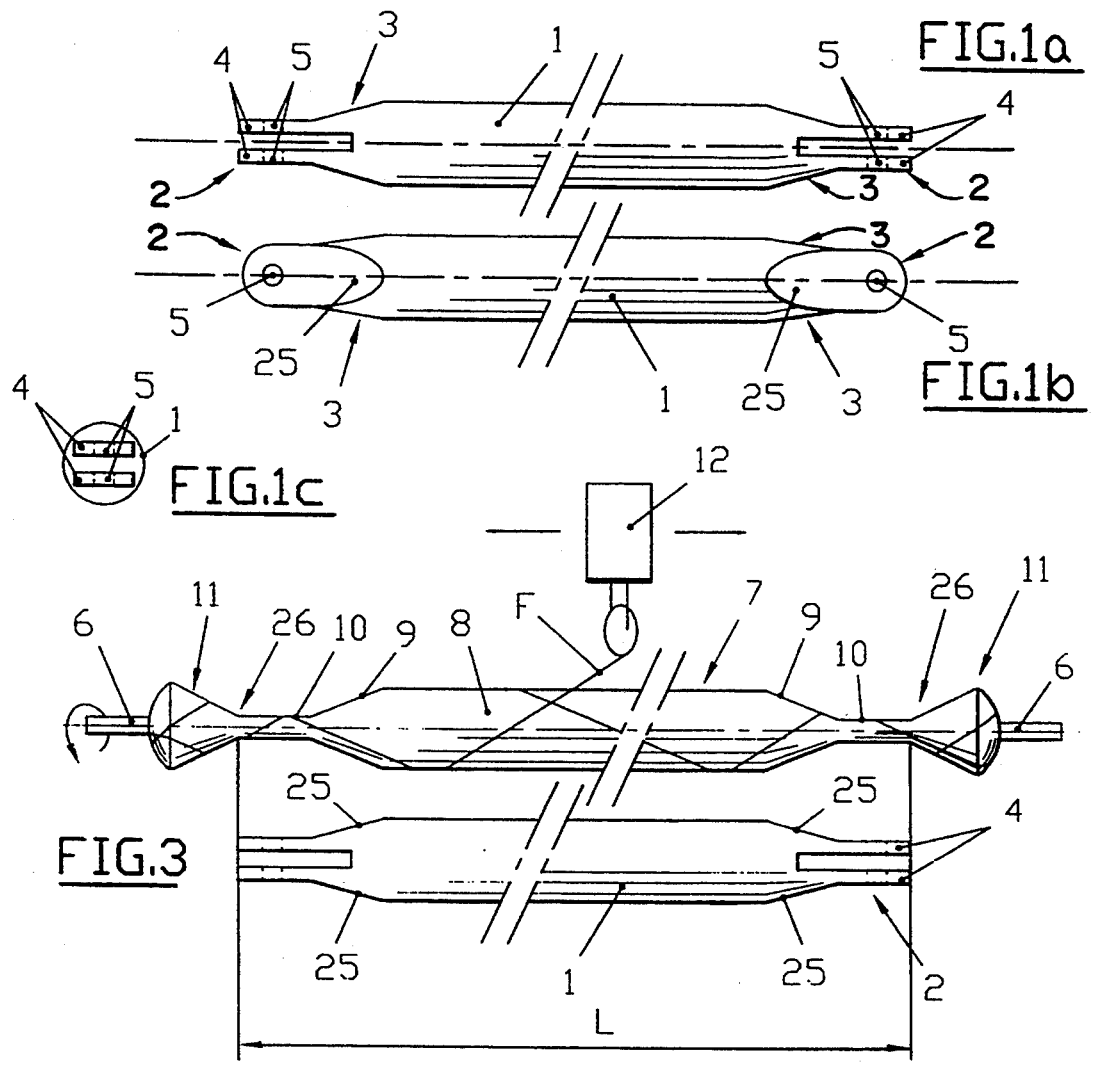
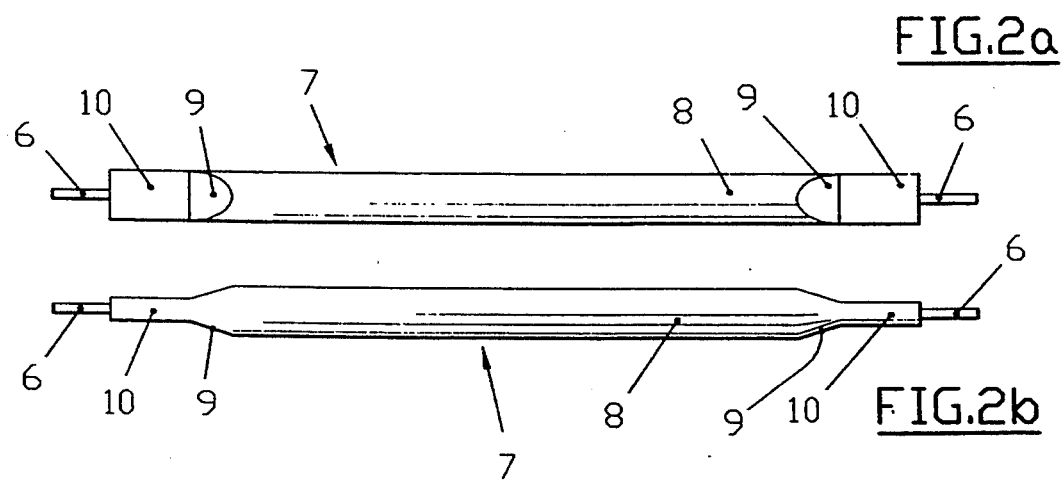

METHOD FOR PRODUCING A MONOBLOCK COMPOSITE CONNECTING ROD BY PLACING PREIMPREGNATED FIBERS ON AN EXTRACTABLE MANDREL

FIELD OF THE INVENTION

The present invention concerns the production of connecting rods to be placed between two points of a structure and able to withstand longitudinal stresses. More particularly the invention concerns monoblock connecting rods made of a composite material formed of a hollow running part, possibly with a cylindrical section, connecting two connecting rod heads with the shape of a fixing strap.

BACKGROUND OF THE INVENTION

French patents FR-2,446,180 and FR-2,550,123 describe how to produce monoblock composite connecting rods whose running portion and end portions are entirely made up of preimpregnated fibers placed on a suitable mandrel which is then placed in a mould whose internal wall fits the shape of the connecting rod to be embodied for the purposes of polymerization.

In FR-2,446,180, the fibers appear in the shape of a fabric wound several turns or "folds" on a deformable mandrel which is then flattened at the two ends.

This technique, apart from the fact that it prohibits embodying heads of a strap connecting rod, does not make it possible to deliberately modulate the local characteristics of the composite material along the connecting rod since this method begins using pre-existing fabrics which are simply plated on the mandrel. In addition, this technique does not really involve genuine monoblock connecting rods as the mandrel remains inside the connecting rods.

In FR-2,550,123, the fibers are placed unidirectionally in the longitudinal axis of the connecting rod on an expansible mandrel which shall next be "inflated" to fit the shape of the mould.

This unidirectional placing required by the expanding of the coated mandrel does not make it possible to longitudinally vary on the connecting rod the fiber placing characteristics and solely concerns resistance to longitudinal stresses.

SUMMARY OF THE INVENTION

The present invention seeks to overcome the drawbacks of known techniques by providing a new technique for embodying connecting rods of the type mentioned above and making it possible to embody varying wall thicknesses and deliberately define the positioning characteristics of the fibers.

To this effect, the invention provides a method for producing a monoblock composite connecting rod by placing preimpregnated fibers on an extractable mandrel, wherein the method includes the following successive steps:

embodying on a rigid central shaft an extractable mandrel having a shape corresponding to that of the connecting rod;

winding and/or laying down the preimpregnated fibers according to a predetermined number of layers and inclination of the fibers with respect to the longitudinal axis of the mandrel;

polymerization with a homogeneous compacting pressure being applied to the entire outer surface of the unit obtained;

then final operations for removing the mandrel and machining to the required dimensions of the connecting rod.

After winding and laying down the fibers and prior to compacting-polymerization of the composite material, each connecting head is preferably provided with suitable means for shaping the strap or fixing portion of the connecting rod.

According to one mode of operation, the entire mandrel provided with fibers and possibly the means for shaping the end portions of the connecting rod are disposed inside a bladder which is then placed under a vacuum and then the unit is placed in an autoclave under pressure so as to provide the polymerization.

According to one application of the method for embodying a connecting rod comprising at each end a strap connected to a running part with a variable section and wall thickness, the fibers are wound onto the mandrel unit via circumferential and longitudinal winding and, on the straps and transition parts, the fibers are placed by winding and laying down according to the local thicknesses to be obtained.

According to one embodiment, a glue film and possibly at least one glass fabric layer is/are laid down between at least some of the layers of fibers of at least the running part.

An extractable mandrel is understood to be a mandrel which, once the composite material has been polymerized, may be removed from the inside of the connecting rod via either of its ends without damaging the connecting rod. For example and according to one embodiment, the mandrel is moulded in a meltable material, especially a mixture of sand and binder, such as the material commercially known as "arenyl".

The method for embodying connecting rod via winding/laying down according to the invention allows for mechanization of industrial production and enables costs to be reduced with respect to rival known techniques, especially draping techniques which require a large number of operators and operations for cutting the fabrics.

Moreover, the laying down/winding technique is able to fully control the quality of the connecting rod and its performances in absorbing stresses owing to the fact of optimizing the direction and orientation of the fibers in the various portions of the connecting rod.

Finally, the conjunction of a homogeneous external pressure exerted on the entire outer surface of the connecting rod and polymerization ensure an optimal compacting of the composite material.

BRIEF DESCRIPTION OF THE DRAWINGS

Other characteristics and advantages shall appear more readily from the following description of one embodiment of the method of the invention, the description being given accompanying drawings in which:

FIGS. 1a, 1b and 1c respectively, represent a top view, front view and end view of a connecting rod with a cylindrical running portion and a strap at each end;

FIGS. 2a and 2b respectively, represent a front view and top view of a mandrel according to the invention for embodying a connecting rod of the type of FIGS. 1a to 1c;

FIG. 3 illustrates a step for winding a mandrel of the type shown on FIGS. 2a and 2b;

DETAILED DESCRIPTION OF THE PREFERRED EMBODIMENTS

Figure 5:
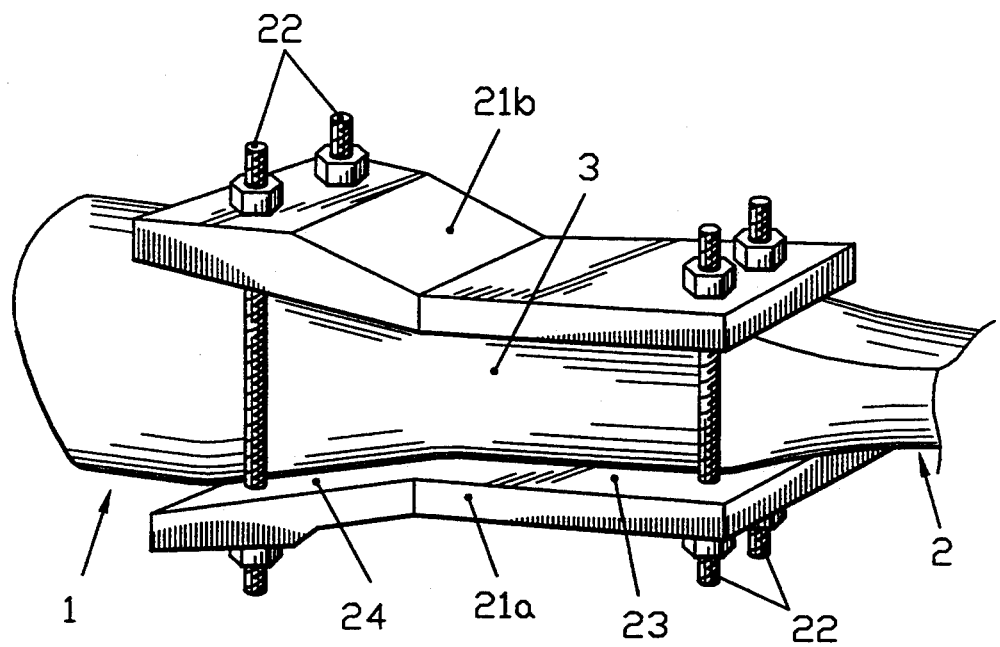
FIG. 5 is a perspective view illustrating an embodiment of shaping parts on a strap of the connecting rod.

FIGS. 1a to 1c diagrammatically show a type of connecting rod able to be embodied with the method of the invention and formed of a hollow cylindrical running part 1 with a wall of constant thickness and connecting two identical connecting rod heads with the shape of a strap 2 being inscribed in a cylinder having a diameter slightly smaller than that of the running portion 1, the straps being connected to the latter by a transition portion 3 with a varying section and a gradually increasing wall thickness, thus thickening the running portion 1 at the strap 2. Each strap 2 is formed of two parallel cheeks 4 with a rectangular section and pierced with two opposing holes 5.

FIGS. 2a and 2b diagrammatically represent a type of mandrel according to the method of the invention able to embody a connecting rod made of a monoblock composite material of the type of FIGS. 1a to 1c.

This mandrel is formed of a central rigid rod 6, possibly metallic, and preferably hollow with a porous wall or pierced with holes (6a, FIG. 6), so as to ensure the degassing of the material of the mandrel at the time it is heated and on which a body 7 is moulded in sand mixed with a binder, for example the material commercially known as "arenyl" which is a material soluble in hot water and which may thus be melted and recovered. The body 7 is moulded to the general internal shape of the connecting rod to be obtained.

The body 7 has a central cylindrical portion 8 extended at each end by a transition portion 9 corresponding to the portions 3 of the connecting rod. The transition portions 9 are extended by a portion 10 with a rectangular section constituted, as shown on FIG. 4, by a metallic part joined onto the central hollow rod 6 and used as a support for embodying the strap 2 of the connecting rod.

FIG. 3 shows in full the mandrel including the end elements extending the portions 10 and constituted by return pears 11 providing the winding loop at the time of return of the head 12 for placing the fibers F which, for example, are carbon fibers preimpregnated with a suitable resin.

Shown at the lower portion of FIG. 3 is the connecting rod of FIG. 1a and which shall be embodied with the mandrel 7, the connecting rod occupying a mandrel length L equal to the distance between the two pears 11.

After the laying down/winding of the mandrel and polymerization of the composite material, the method continues with the final machining and finishing operations.

FIG. 3 shows the winding of the mandrel with the aid of the head 12.

Prior to winding/laying down, the mandrel is advantageously coated with a film or non-porous fabric so as to avoid any infiltration of resin into the material of the mandrel at the time of the subsequent polymerization.

The fibers F are placed by means of winding or laying down.

The mandrel is laid out by circumferential or longitudinal winding along various angles of inclination with respect to the axis of the mandrel.

Figure 6:
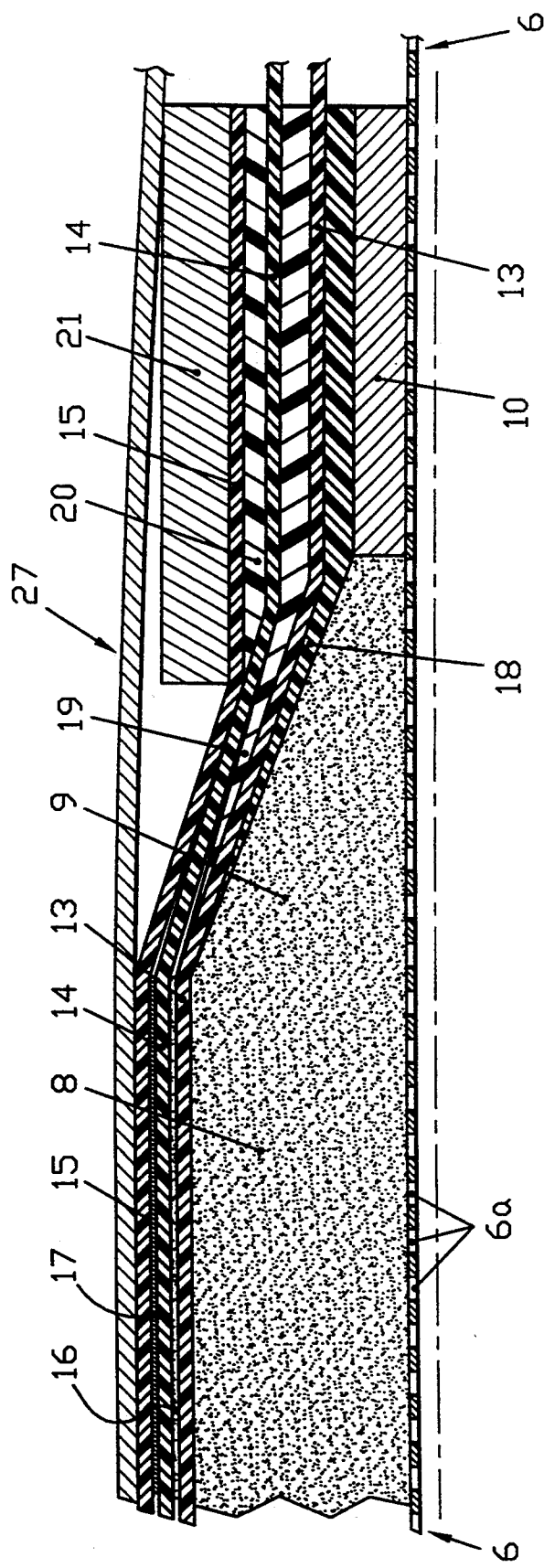
FIG. 6 partially presents the mandrel of FIG. 4 inserted in a compacting bladder.

FIG. 6 shows two layers of fibers wound longitudinally, namely respectively 13 and 14, extending over the entire length of the mandrel, as shown in FIG. 3, and a layer 15 of fibers wound circumferentially, also extending over the entire length of the mandrel.

Inserted between the two layers of longitudinal fibers 13, 14 opposite the cylindrical portion 8 is a glue film 16 placed by laying down, whereas a glass fabric 17 is placed by laying down between the second layer of longitudinal fibers 14 and the layer of circumferential fibers 15.

The thickness of the fibers of the cylindrical portion 8 is constant from one end to the other.

At the height of the portions 9 of the mandrel, the thickness of the fibers is variable and increases as far as in the strap zone at the height of the portions 10.

To this effect, laid down between the first layer 13 and the mandrel (portion 9) and between the layers 13 and 14 are fibers 18 and 19 respectively, by means of circumferential or longitudinal placing so as to obtain the evolution of the desired thickness. Placing is effected in such a way so as to obtain the desired progressive thickness between the portions 8 and 10 of the mandrel.

Of course, the layer 18 is placed on the portions 9, 10 of the mandrel before the winding/laying down of the first layer 13 and the layer 19 is immediately placed after the layer 13 and before the second layer 14. After the layer 14 is placed on the portions 10, a third layer of fibers 20 is laid down which slightly projects over the portions 9. The placings of the layers 18, 19 and 20 opposite the portions 10 are effected so as to obtain a total constant thickness of the fibers.

FIG. 6 concerns a simple illustrative example of the connecting rod structure of the invention, as it is clear that the total number of layers of preimpregnated fibers, glue films and glass fabrics could be greater than the number represented and that it is possible to select any method for superimposing the various layers at the level of each of the portions 8, 9 and 10 of the mandrel.

Winding and laying down shall be effected along various angles, for example 0 degrees, ±25 degrees, ±45 degrees; 90 degrees.

It is to be noted that for a given layer, the angle of inclination of the wound fiber or laid down may vary according to the zone of the connecting rod.

Preferably, the glass fabric layer 17 is the sole layer and constitutes the penultimate layer, the final layer (15) being a layer of fibers wound circumferentially on the entire mandrel.

Figure 4:
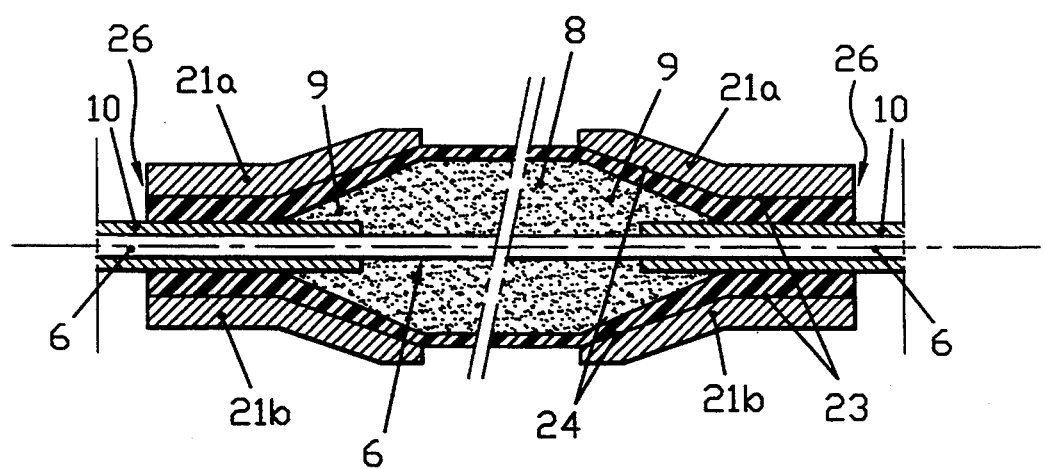
FIG. 4 diagrammatically represents an axial longitudinal section of a mandrel covered with fibers and provided at its ends with shaping parts.

Once the various layers are laid down, the mandrel is provided on its end portions 9 and 10 with parts for shaping the connecting rod straps symbolized at 21 in FIG. 6 and shown in more detail according to an embodiment on FIGS. 4 and 5.

The shaping parts are, for example, two plates 21a, 21b (FIG. 5) disposed opposite each other sandwiching the portions 9 and 10 and brought together by tie rods 22 able to adjust the pressure exerted by the plates 21a, 21b on the subjacent composite material.

The plates 21a, 21b comprise an internal flat surface 23 parallel to the axis of the tube 6 and a slanted internal flat surface 24 to correspond with the outer surface of the composite material opposite the portions 9.

The surfaces 23 and 24 define the outer faces of the cheeks 4 of the straps 2, as well as a portion (25, FIGS. 1b and 3) of the connecting surfaces between the straps and the running portion of the connecting rod.

Figure 12:
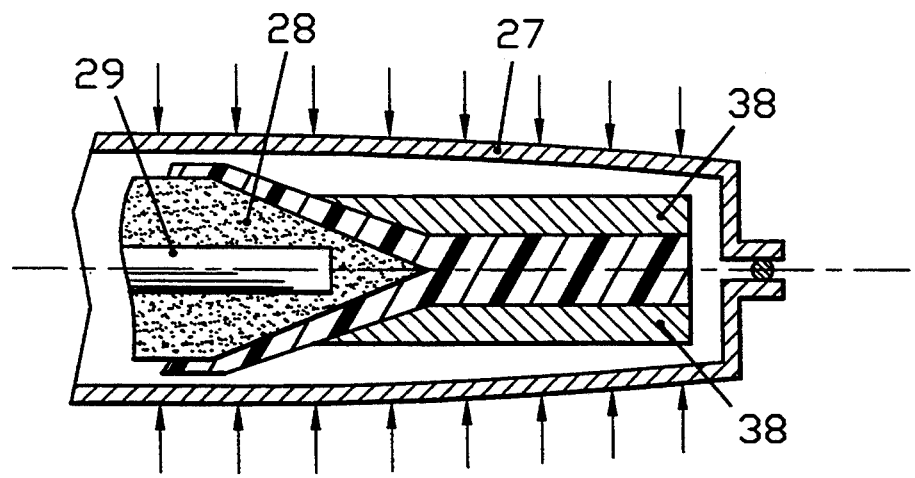
Figure 13:
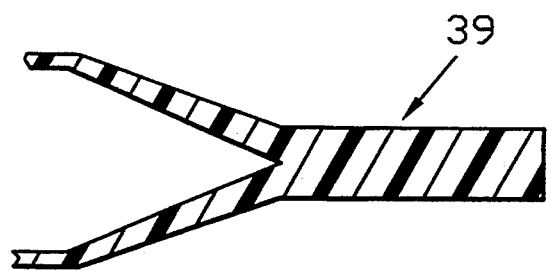
Figure 14:
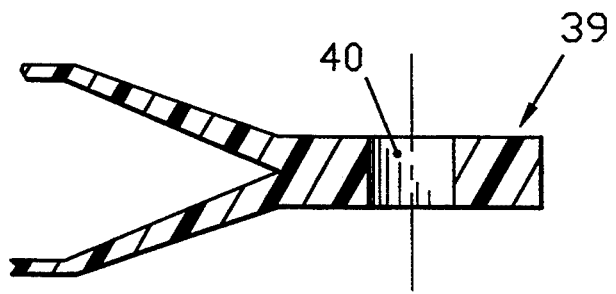

After placing of the shaping parts 21a, 21b, the composite material is slit at the two ends at 26 (FIGS. 3 and 4) and the tube 6 / mandrel 7 / composite material-shaping parts unit is placed inside a sealed bladder 27 (FIGS. 6 and 12) which is placed under a vacuum, the unit with its bladder being then placed in an autoclave so as to polymerize the resin of the composite material.

The autoclave treatment is effected in accordance with temperatures and periods suitable for the polymerization cycle, the oven of the autoclave being at the start of polymerization pressurized to several bars.

The bladder 27, whilst ensuring the application of a homogeneous compacting pressure to the entire outer surface of the composite material, prevents any under pressure gases contained in the autoclave from penetrating into the material.

Once polymerization has ended, the bladder 27 is removed, the end parts 10 of the mandrel are extracted, and then the mandrel is immersed into hot water with a maximum temperature of 50° C. so as to soften the sand (8, 9), remove the tube 6 and protective film of the mandrel, and finally rinse the inside and outside of the embodied connecting rod.

The final finishing phase consists of machining the connecting rod (lengthening L, routering of the straps 2, facing of the cheeks 4, boring of the holes 5 and of then inspecting the connecting rod by, for example, means of ultrasonics.

The running portion 1 of the final connecting rod is hollow, as well as its two transition portions 3, the internal space opening onto the outside between the cheeks 4 of the straps 2. In the case of a cylindrical running portion 1 and straps with a general rectangular section, the transition portions 3 have an external surface which is a transition surface starting from a circle (running portion 1) and ending at a rectangle (strap 2).

The type of mandrel used in the invention is able to resist high external pressures. This makes it possible to place the fibers by winding and laying down, thus ensuring excellent compacting of the composite material and allows for fast, easy and automatic fiber placing.

The large number of possibilities for positioning fibers or other elements of the composite material (direction and orientation of fibers, alternation of layers, adding of supplementary layers, such as the glue film 16 or glass fabric 17 or another material) in the various portions of the connecting rod provide the latter with remarkable properties of mechanical resistance to various stresses (compression, traction, buckling, torsion, resistance to impacts).

Finally, the invention is not merely limited to the embodiments shown and described above, but on the contrary covers all possible variants, especially as regards the nature of the composite material (fibers, resin, glue film, reinforcement fabric), the shapes and dimensions of the running portion, end portions and the transition portions of the connecting rod, the nature and disposition of the means subsequently used for shaping the end portions of the connecting rod, as well as the methods for applying pressure to the mandrel coated with fibers and for embodying a mandrel able to be extracted from the inside of the connecting rod without damaging the latter.

The method of the invention may be implemented so as to obtain connecting rods comprising a strap at one end and a single flattened head at the other end.

FIGS. 7 to 14 show the embodiments of such a connecting rod.

So as to take account of the shape of the end at the flattened head or ear of the connecting rod, the mandrel 28 comprises a central hollow perforated rod 29 similar to the rod 6 of FIG. 6 but only extending into the sand body 30 as far as the height of the transition portion 31 from the central portion 32 to the portion of the mandrel corresponding to the flattened head of the connecting rod.

Fixed by gluing in the extension of the transition portion 31 which, together with the central portion 32 is composed of "arenyl" like the portions 8 and 9 of the mandrel of FIG. 6, is a metallic part 33 with a flattened rectangular section on which to be wound or laid down are the fibers corresponding to the flattened head of the connecting rod. The end of the part 33 is preferably forked via its section on the edge 34 of the portion 31.

Disposed above the part 33 is a rod 35 integral with the part 33 and within the axis of other rod 29, the rods 29, 35 defining the spin axis of the mandrel 28. Disposed on the rod 35 next to the part 33 is a return pear 36 similar to the pears 11 of FIG. 3.

Placing by winding or laying down of the fibers on the mandrel 28, whose other end is similar to the left portion of the device of FIG. 4 as at this other end a normal strap is provided with two cheeks, is effected as in the example of FIG. 6.

Figure 7:
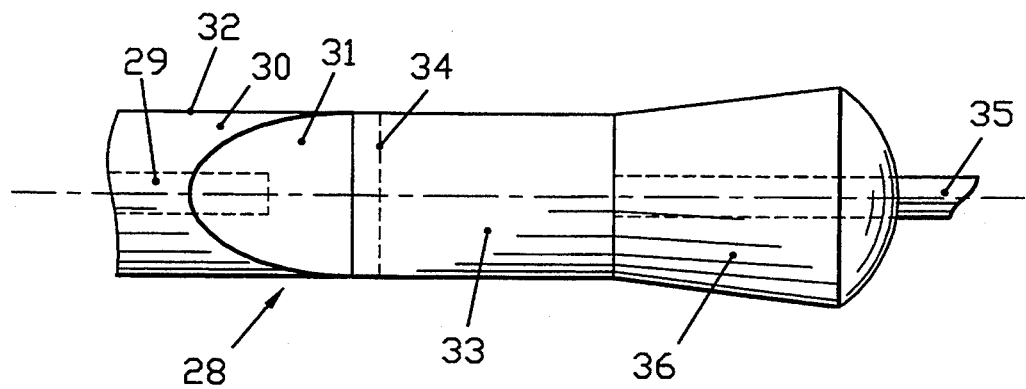
FIGS. 7 to 14 illustrate the embodiment of a connecting rod provided at one end with a strap and at the other end a flattened head.
Figure 8:
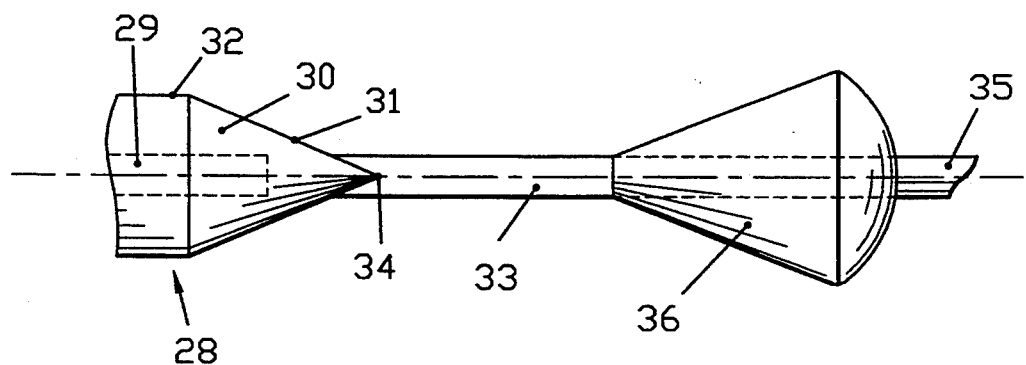
Figure 9:
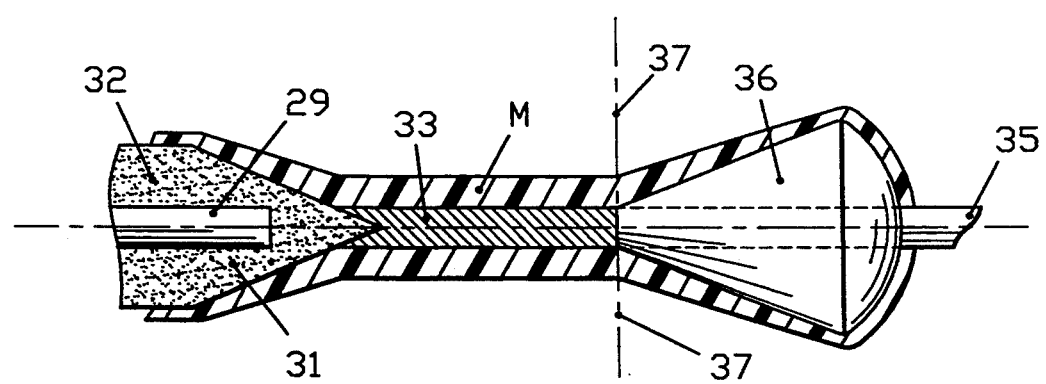

FIG. 9 represents the mandrel coated with the fibers of FIGS. 7 and 8.

Figure 10:
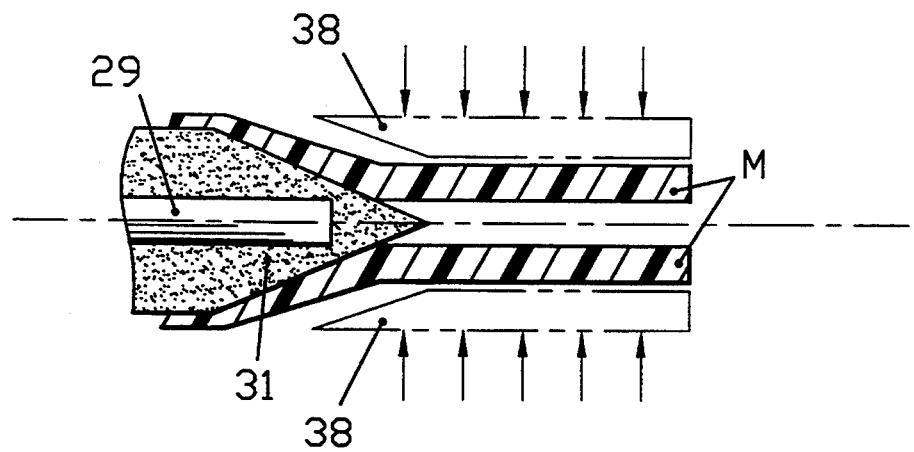

The composite coating material M is then slit at 37 so as to remove the rod 35, the pear 36 and the part 33, as shown on FIG. 10.

Figure 11:
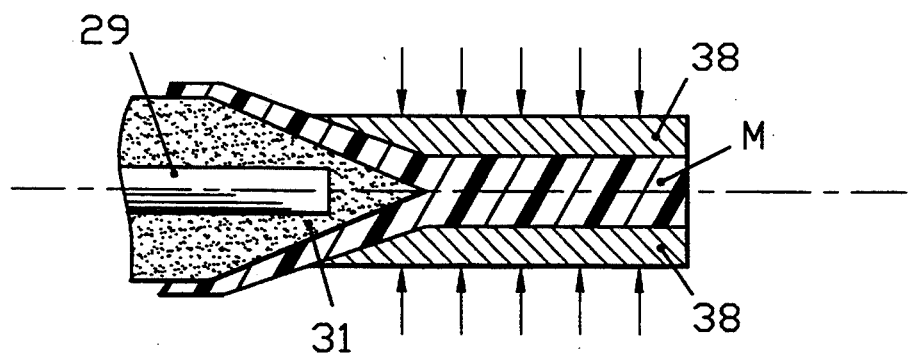

Two shaping parts 38 similar to the parts 21a, 21b of FIG. 5 are placed in the way of a clamp on the two opposing flanks of the portion of the composite material M opposite the mandrel portions 31 and the removed part 33. By bringing together the parts 38, the cavity left by the removal of the part 33 is suppressed (FIG. 11).

The entire mandrel with its shaper 38 are placed as in the example of FIG. 6 in a bladder (FIG. 12), the entire unit then being placed in an autoclave so as to polymerize the resin of the composite material under pressure.

After polymerization, the bladder 27 is extracted, the sand of the mandrel 28 removed after softening by means of hot water introduced by the perforated tube 29 and the hollow connecting rod removed from the mould (FIG. 13) causes to appear at one of its ends a flattened head 39 which (FIG. 14), after routering, facing and boring of a hole 40,.shall constitute a conventional ear or single cheek strap.

What is claimed is:

1. Method for producing a monoblock composite connecting rod by placing preimpregnated fibers on an extractable mandrel, comprising, as successive steps:
   embodying on a rigid central shaft a meltable mandrel having a longitudinal axis and a shape corresponding to that of the connecting rod;
   placing the preimpregnated fibers on the mandrel by at least one of winding and laying down the preimpregnated fibers according to a predetermined number of layers and inclination of the fibers with respect to the longitudinal axis of the mandrel to obtain a preimpregnated fiber/mandrel unit including an outer surface;

polymerizing the unit while applying a homogeneous compacting pressure to the entire outer surface of the unit; and removing the mandrel and machining the polymerized preimpregnated fibers to required dimensions of the connecting rod.

2. The method according to claim 1, wherein, after the placing of the fibers and prior to polymerizing of the unit, at least one end of the unit is provided with an element to shape a strap or a fixing portion of the connecting rod.

3. The method according to claim 2, wherein the unit with the element for shaping is disposed inside a bladder, and the bladder is placed under a vacuum, and the unit is then placed in an autoclave under pressure so as to ensure the polymerization.

4. The method according to claim 1, wherein the fibers are wound onto the mandrel via circumferential and longitudinal winding, and, on fixing and transition portions of the connecting rod, the fibers are placed by at least one of winding and laying down according to a local thickness to be obtained in the connecting rod.

5. The method according to claim 4, wherein the connecting rod comprises fixing portions connected to a running portion having a constant wall thickness by transition portions having a variable section and wall thickness.

6. The method according to claim 5, wherein, after the placing of the fibers and prior to polymerizing of the unit, ends of unit are provided with elements to shape the fixing portions of the connecting rod.

7. The method according to claim 6, wherein the elements to shape the fixing portions comprise:

two parallel flat surfaces capable of being pressed towards each other, to thereby sandwich mandrel portions coated with fibers corresponding to the fixing portions of the connecting rod; and two flat slanted surfaces capable of being pressed towards each other, to thereby sandwich mandrel portions coated with fibers corresponding to the transition portions of the connecting rod.

8. The method according to claim 1, wherein the connecting rod includes a running part, and a glue film is placed between at least some of the layers of fibers of at least the running part.

9. The method according to claim 8, wherein a glass fabric layer is placed between at least some of the layers of fibers of at least the running part.

10. The method according to claim 1, wherein the connecting rod includes various zones, and the placed fibers have varying angles of inclination according to the zones of the connecting rod.

11. The method according to claim 1, wherein the mandrel is embodied by mixing sand and a binder, and is removed by melting.

12. The method according to claim 11, wherein the connecting rod comprises straps, and portions of the mandrel used to support placing of fibers for the straps comprise metallic parts mounted on a central shaft.

13. The method according to claim 11, wherein the connecting rod comprises a strap at one end and a flattened head at another end, and a portion of the mandrel used to support the placing of fibers for the strap comprises a metallic part mounted on a central shaft, a portion of the mandrel used to support the placing of fibers for the flattened head comprises a movable portion mounted at an end of the mandrel, and the central shaft only extends into the end of the mandrel.

14. The method according to claim 1, wherein the central shaft is hollow and comprises a porous wall.

15. The method according to claim 1, wherein the central shaft is hollow and comprises a wall including holes therethrough.

* * * * *